United States Patent [19]

Fujino

[11] Patent Number: 4,643,553
[45] Date of Patent: Feb. 17, 1987

[54] ELECTRO-MAGNETICALLY DRIVEN SHUTTER

[75] Inventor: Masahisa Fujino, Tokyo, Japan

[73] Assignee: Canon Kabushiki Kaisha, Tokyo, Japan

[21] Appl. No.: 741,633

[22] Filed: Jun. 5, 1985

[30] Foreign Application Priority Data

Jun. 14, 1984 [JP] Japan .................................. 59-122620
Jun. 14, 1984 [JP] Japan .................................. 59-122621
Jun. 14, 1984 [JP] Japan .................................. 59-122622

[51] Int. Cl.4 .................................................. G03B 9/62
[52] U.S. Cl. .................................................. 354/234.1
[58] Field of Search ........................... 354/234.1, 235.1

[56] References Cited

U.S. PATENT DOCUMENTS

| 4,133,608 | 1/1979 | Tanaka ............................ 354/235.1 |
| 4,302,090 | 11/1981 | Kiuchi et al. ..................... 354/234.1 |
| 4,306,797 | 12/1981 | Sugiura et al. ................... 354/234.1 |
| 4,364,654 | 12/1982 | Senuma et al. ................... 354/234.1 |
| 4,487,492 | 12/1984 | Toyoda et al. ................... 354/234.1 |

*Primary Examiner*—Michael L. Gellner
*Attorney, Agent, or Firm*—Toren, McGeady and Goldberg

[57] ABSTRACT

An electro-magnetically driven shutter is arranged to make an exposure by driving shutter blades to travel with driving members with power supply effected to an electro-magnetic drive source and to cut off the power supply upon completion of the travel of the shutter blades. The shutter blades are kept in their travel completed positions by locking the driving members with spring members and then, in response to a film winding action, the driving members are unlocked by pushing back the driving members in a travel starting direction with the shutter blades being brought by inertia back to their travel start positions respectively.

7 Claims, 7 Drawing Figures

ELECTRO-MAGNETICALLY DRIVEN SHUTTER

BACKGROUND OF THE INVENTION

1. Field of the Invention

This invention relates to an improvement on an electro-magnetically driven shutter.

2. Description of the Prior Art

Electro-magnetically driven shutters are in general arranged to have shutter blades drive by an electromagnetic driven source to travel for an exposure and to have the shutter blades driven by return springs back to their travel start position. As disclosed, for example, in the specification of U.S. Pat. No. 4,302,090, in the conventional shutters of this kind, a current is continuously supplied to the electro-magnetic drive source until completion of an exposure to have the shutter blades kept in their travel completed positions against the forces of the return springs. However, since the driving force of the electro-magnetic drive source is extremely weak, a large amount of current is consumed in keeping the shutter blades in the travel completed positions against the force of the return springs. Therefore, since an apparatus such as a camera is generally allowed to have only a battery of a small capacity, the battery is used up in a short period of time. This has presented a problem.

Further, in the case of the conventional shutter of this kind, the current is allowed to flow to a moving coil for leading shutter blades under a locked condition always for a longer period of time than a moving coil for trailing shutter blades. This causes a rise in the temperature of the coil. As a result, the resistance value of the coil which has a temperature dependency increases to lower the amount of the current flow.

Meanwhile, the electro-magnetic force to be used for driving the shutter is proportional to the product of the current flowing to the moving coil and the number of turns of the coil. Therefore, the travelling speed of the leading shutter blade gradually decreases. The precision of the shutter eventually degrades according as the number of times of shutter release increases. This tendency is salient particularly in the case of a motor driven shutter.

Further, in order to have the shutter blades driven to precisely travel with the weak driving force of the electro-magnetic drive source, the above-stated return spring must have a very weak spring force. This results in a weak shutter blade holding force in the shutter travel start position. Then, the weak holding force has sometimes allowed an external shock to accidentally cause an exposure by dislocating the shutter blades from their positions within an aperture. It has been another problem that, with some minor vibrations applied to the camera, if the shutter blades deviate from their travel start position even to a slight degree, the timing for their travel deviates from correct timing and thus degrades the precision of the shutter.

Since the return springs are weak, the time required for returning the shutter blades becomes longer and the shutter operation becomes unstable. Therefore, a film winding speed becomes insufficient in the event of a consecutive photographing operation which is to be performed by a motor drive arrangement. A leak of a light flux tends to occur during the process of a return of the shutter blades. A further problem with the prior art shutters includes degradation of shutter precision due to a shortened time interval between completion of the travel of the shutter blades and the start of a next travel of them.

SUMMARY OF THE INVENTION

It is a first object of this invention to provide an electro-magnetically driven shutter wherein shutter blades are arranged to be locked in their travel completed position by means of spring members and to be forcedly pushed back toward their travel start positions by the driving force of a film winding mechanism; the shutter blades can be kept in their travel completed positions and released from the travel completed positions without necessitating supply of a large current even in the event of a weak driving force; and then shutter blades can be promptly and accurately returned to their travel start positions.

It is a second object of this invention to provide an electro-magnetically driven shutter wherein there are provided blocking members which do not act on the shutter blades while they are travelling but prevent them from bouncing when they come back to their travel start positions. The blocking members are arranged such that the shutter baldes are effectively prevented from springing out during their waiting-for-travel period and from bouncing upon return to their travel start positions without affecting their travel even in the event of an electro-magnetically driven shutter which does not allow use of a strong return spring because of a small driving force.

These and further objects and features of this invention will become apparent from the following detailed description of a preferred embodiment thereof taken in connection with the accompanying drawings.

DETAILED DESCRIPTION OF THE PREFERRED EMBODIMENT

Figure 1:
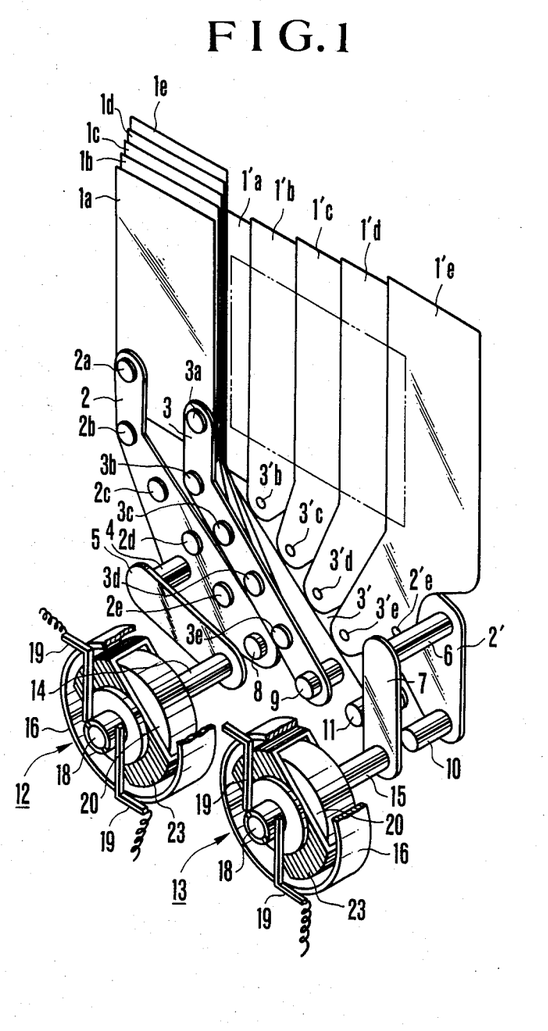
FIG. 1 is an oblique view showing the operating principle of an electro-magnetically driven focal plane shutter.
Figure 2:
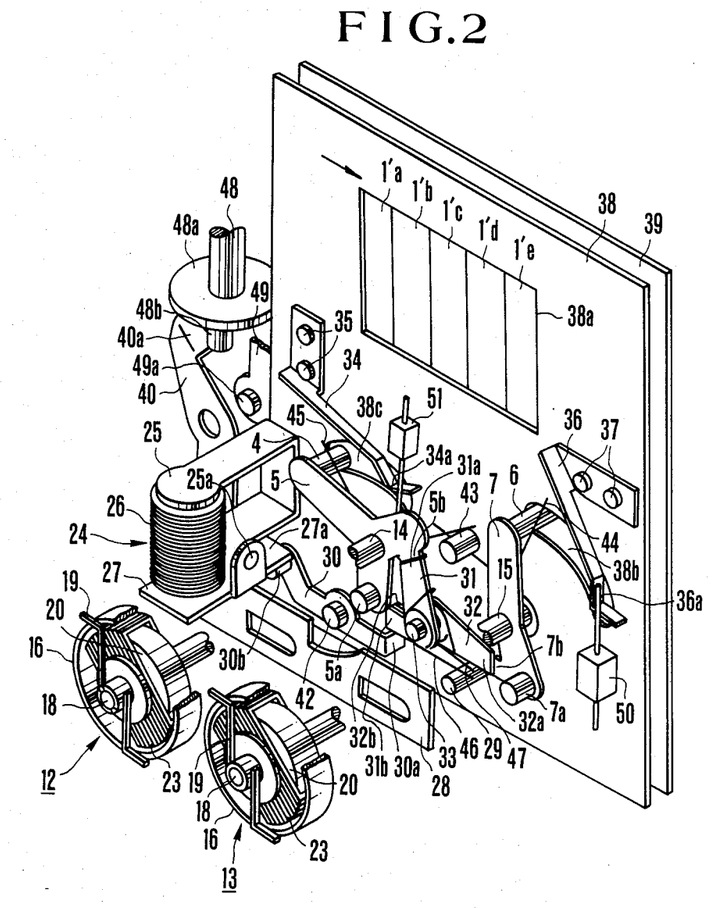
FIG. 2 is an oblique view showing an electro-magnetically driven shutter arranged according to this invention.

The following describes an embodiment of this invention with reference to the accompanying drawings: FIG. 1 shows the fundamental structural arrangement of an electro-magnetically driven focal plane shutter embodying this invention. The illustration includes a slit forming blade 1a of a trailing shutter blade group and auxiliary blades 1b–1e. They are mounted on arms 2 and 3 via connection pins 2a–2e and 3a–3e. The arms 2 and 3 are pivotally mounted on shafts 8 and 9 which are provided on a base plate 38 as shown in FIG. 2 in such a way as to form a parallel link arrangement. In a travel start position which is as shown in FIG. 1, the trailing shutter blade group is folded and stowed on one side of an aperture. A slit forming blade 1'a and auxiliary blades 1'b–1'e of a leading shutter blade group are also mounted via connection pins 2'a–2'e on arms 2' and 3' which are turnable on shafts 10 and 11. Another parallel link arrangement is thus formed in the same manner as the trailing shutter blade group. Before the start of its travel, the leading shutter blade group is in a state of covering an aperture.

An electro-magnetic drive source 12 for the trailing shutter blades is attached via a mounting member which is not shown to a base plate of the shutter. The drive source 12 includes a permanent magnet 20; a yoke 16; a moving coil 23 which is arranged to rotate within the magnetic field of the permanent magnet 20; a trailing blade driving shaft 14 which is secured to the coil 23 and is arranged concentrically with the shaft of the above-stated arm 2; the commutator 18 of the coil 23; and a brush 19 for power supply.

To the lower end of the trailing blade driving shaft 14 is secured a trailing shutter blade driving lever 5. A pin 4 which is attached to the lower surface of the lever 5 follows a slot provided in the above-stated lever 2 to transmit the rotation of the coil 23 to the lever 2.

An electro-magnetic drive source 13 for the leading shutter blades is also arranged in the same manner as the electro-magnetic drive source 12 for the trailing shutter blades. The driving shaft 15 of the drive source 13 is connected to the leading blade arm 2' via a leading blade driving lever 7 and a pin 6.

FIG. 2 shows the structural arrangement of an electro-magnetically driven shutter which embodies this invention. The leading and trailing shutter blades are held between a base plate 38 and a cover plate 39. The rotation of the coils 23 of electro-magnetic drive sources 13 and 12 is transmitted to the arms 2' and 2 via driving pins 6 and 4 which pierce arcuate slots provided in the base plate 38. With the rotation of the coils thus transmitted shutter blades are caused to travel in the direction of the arrow respectively to open and close an aperture 38a. A leading blade spring-out preventing lever 32 is pivotally carried by a shaft 33 provided on the base plate 38 and is being urged by a spring 47 to turn counterclockwise. When the leading blades are in their travel start position, the fore end 32a of the preventing or blocking lever 32 confronts an arm 7b of the above-stated leading blade driving lever 7 to prevent the lever 7 from turning and to prevent the aperture from being opened by the movement of the slit forming blade. A trailing blade spring-out preventing or blocking lever 31 is pivotally carried also by the shaft 33. A spring 46 urges the blocking lever 31 to turn counterclockwise. The fore end 31a of the lever 31 engages an arm 5b of the trailing blade driving lever 5 to prevent the trailing blades from jumping out into the aperture.

Figure 3:
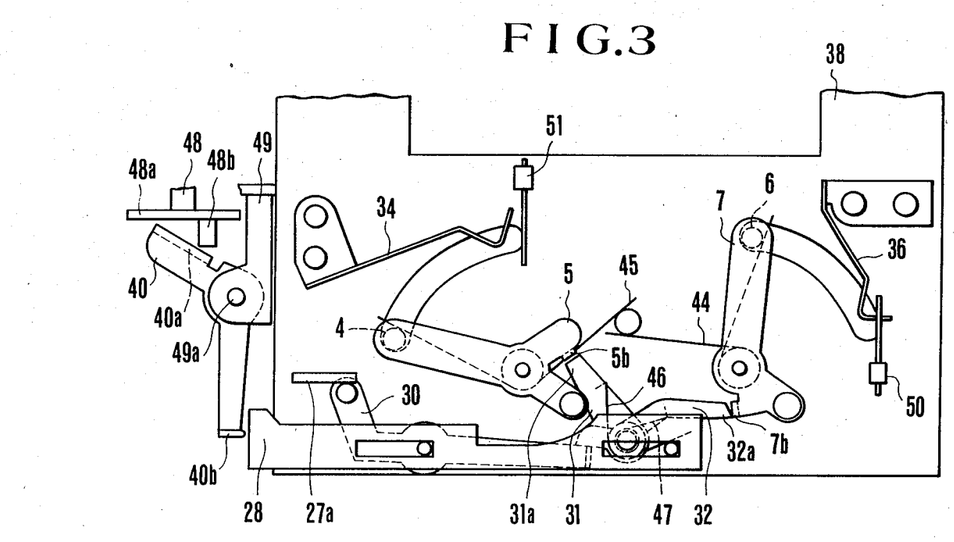
FIGS. 3, 4, 5, 6 and 7 are plan views respectively showing the operating states of the mechanical arrangement of the same embodiment shown in FIG. 2 at varied stages of the shutter operation.

An actuation lever 30 is pivotally carried by a shaft 42 and is arranged to act on the above-stated blocking levers 31 and 32. The actuation lever 30 has an arm thereof engaging the arms 32b and 31b of the blocking levers 32 and 31 at a bent part 30a thereof. A pin 30b is secured to the other end of the actuation lever 30. An electromagnet 24 is secured via a mounting member 25 to the base plate 38. When the coil 26 is energized, the electromagnet 24 attracts an armature 27 to cause it to rotate around a shaft 25a. Then, an end 27a of the armature 27 pushes the above-stated pin 30b. The pin 30b then in turn causes the actuation lever 30 to turn counterclockwise. A charge lever 28 is arranged to push the leading blade driving lever 7 and the trailing blade driving lever 5 back to their travel start positions in response to a film winding operation. The charge lever 28 is provided with slots which permit the lever to slide over the shafts 29 and 42 in the longitudinal direction thereof. A film winding responsive shaft 48 is arranged to make one turn every time one frame portion of film is wound up according as a film winding arrangement which is not shown operates. A pin 48b is secured in an eccentric position to a disc 48a which is provided at the lower end of the shaft 48. A return lever 40 is pivotally carried by a shaft 49a which is provided on a base plate 49. The return lever 40 is arranged to turn on the shaft 49a accordingly as the shaft 48 rotates with a bent part 40a thereof abutting on the above-stated pin 48b. With the return lever 40 thus caused to turn, the lower end part 40b (which is shown in FIG. 3) causes the charge lever 28 to move rightward as viewed on the drawing. Return springs 44 and 45 are arranged to urge the leading and trailing blade driving levers 7 and 5 to turn toward their travel start positions respectively. Holding springs 36 and 34 are arranged to keep the driving pins 6 and 4 in their travel completed positions respectively and have their base parts secured to the base plate 38 by means of rivets 37 and 35. The holding springs 36 and 34 have bent engaging parts 36a and 34a which are formed at the fore ends of these springs and are protruding close to the end points of the movement path of the driving pins 6 and 4 respectively.

A leading blade travel completion switch 50 is arranged to turn on when it is pushed by the leading blade driving pin 6. A trailing blade travel completion switch 51 is arranged to turn on when it is pushed by the trailing blade driving pin 4.

The shutter operates as follows: With the aperture in a state of being covered by the leading shutter blades 1'a-1'e as shown in FIG. 1, when a current flows to the leading blade driving coil 23 via the power supply brush 19 and the commutator 18, a magnetomotive force develops at the coil according to the left-hand rule of Fleming. A rotating force then develops at the driving shaft 15. This rotation causes the blade driving arm 2' to turn on the shaft 10 via the leading blade driving lever 7 and the driving pin 6. Since a parallel link mechanism is formed jointly by the arms 2' and 3' and the shutter blades 1'a-1'e as mentioned in the foregoing, these blades move in parallel from left to right as viewed on the drawing with their overlapping degree increasing according as the arm 2' turns. Then, the aperture is opened and an exposure begins. Following this, when a current is likewise allowed to flow to the trailing blade driving coil 23, the trailing blade driving shaft 14 rotates to cause the trailing blades 1a-1e to move to the right as viewed on the drawing with their overlapped state gradually unfolded to cover the aperture. The exposure comes to an end with the aperture thus covered.

While the leading and trailing blades are in a state of waiting for commencement of travel for an exposure as mentioned above, the leading blade driving pin 6 is under the force of the return spring 44 and is abutting on a stopper which is not shown. Therefore, the driving lever 7 is in repose. The leading blade spring-out blocking lever 32 is under the urging force of the spring 47 to push the bent part 30a of the release lever 30 by the left end 32b thereof. The pin 30b which is provided on one arm of the lever 30 is in a state of pushing up the end 27a of the armature 27 while the lever 30 is in repose. Under this condition, the fore end 32a of the blocking lever 32 is opposed to the arm 7b of the leading blade driving lever 7 with a slight clearance left between them as shown in FIGS. 2 and 3. The driving lever 7 is thus prevented from turning in the direction of causing the travel of the blades, so that the shutter blades can be prevented from spring out. The trailing blade spring-out blocking lever 31 is likewise under the force of the spring 46 and is in repose having its left end 31b engaging the actuation lever 30. Meanwhile, the fore end 31a of the blocking lever 31 is opposed to the arm 5b of the trailing blade driving lever 5 with a slight clearance left between them.

Figure 4:
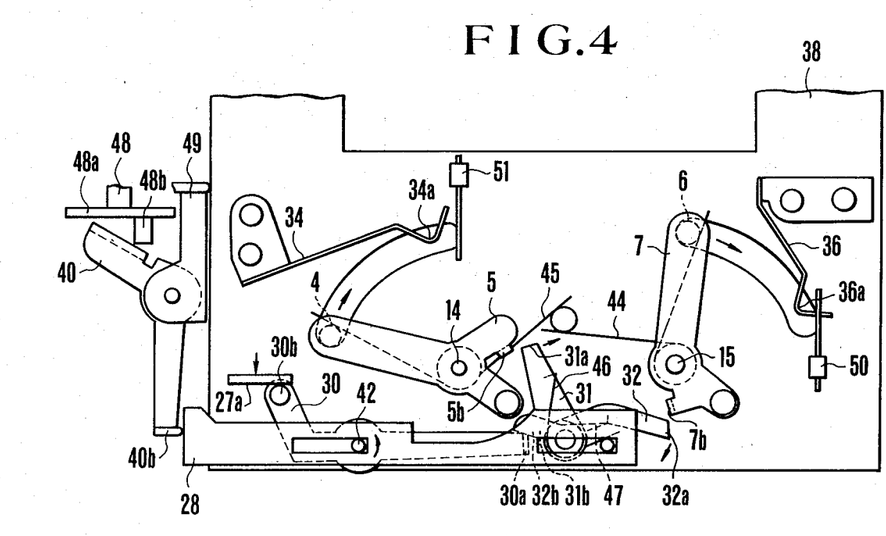
Figure 5:
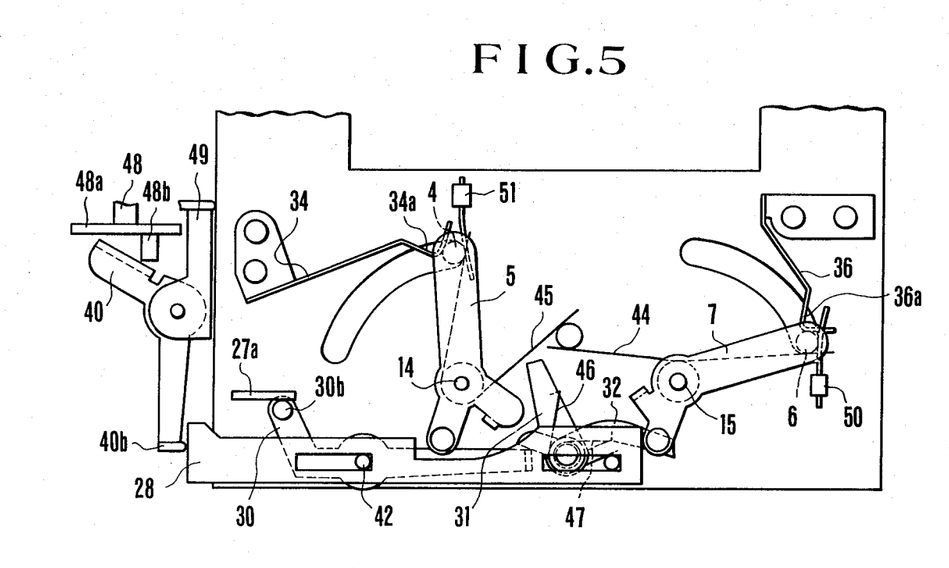

When a shutter release operation is performed, the coil 26 of the electromagnet 24 is first energized. The armature 27 is attracted by the yoke and rotates clockwise about the shaft 25a. The end 27a of the armature 27 pushes the pin 30b to cause thereby the actuation lever 30 to turn counterclockwise about the shaft 42. Therefore, as shown in FIG. 4, the bent part 30a formed at the right end of the lever 30 pushes up the arm parts 32b and 31b of the blocking levers 32 and 31 to cause these levers to turn clockwise against the forces of the springs 47 and 46. The fore ends 32a and 31a of these levers are thus retracted from their positions in which the movement of the corresponding driving lever is blocked. With the blocking levers 31 and 32 thus retracted from their blocking positions, the shutter blades become capable of travelling. Following that, power supply is effected to the coils 23 of the leading blade drive source 13 and the trailing blade drive source 12 one after another at a time interval according to a preset shutter time value. Then, as mentioned in the foregoing, the driving levers 7 and 5 respectively turn clockwise to actuate the above-stated arms via the driving pins 6 and 4. This causes the shutter blades to travel. Immediately before completion of the travel of the shutter blades, the leading blade driving pin 6 comes to abut on the bent part 36a of the leading blade holding spring 36 which is protruding into the movement path of the pin 6. The travel of the leading blades comes to an end when the pin 6 passes over the bent part 36a against the elastic force of the spring 36. The pin 6 is then held by the holding spring 36 in a manner as shown in FIG. 5. Then, at the same time, the leading blade travel completion switch 50 is pushed by the pin 6 to turn on. With the switch 50 turned on, the power supply to the leading blade driving coil 23 comes to a stop.

The trailing blade driving lever 5 also has the driving pin 4 thereof come to abut on the holding spring 34 immediately before completion of the travel of the trailing blades in the same manner as the leading blades as shown in FIG. 5. Then, the pin 4 passes over the bent part 34a of the holding spring 34 by distorting the spring before the lever 5 comes to be held in its travel completed position by the spring 34. The trailing blade travel completion switch 5 then turns on to cut off the power supply to the coil 23. Concurrently with this, power supply to the electromagnet 24 also comes to a stop. The armature 27 detaches from the yoke 27. The leading blade blocking lever 32 and the trailing blade blocking lever 31 which have been moved to their travel allowing positions via the actuation lever 30 are then returned by the return springs 47 and 46 to their blocking positions to block the driving levers 7 and 5 from turning respectively.

Figure 6:
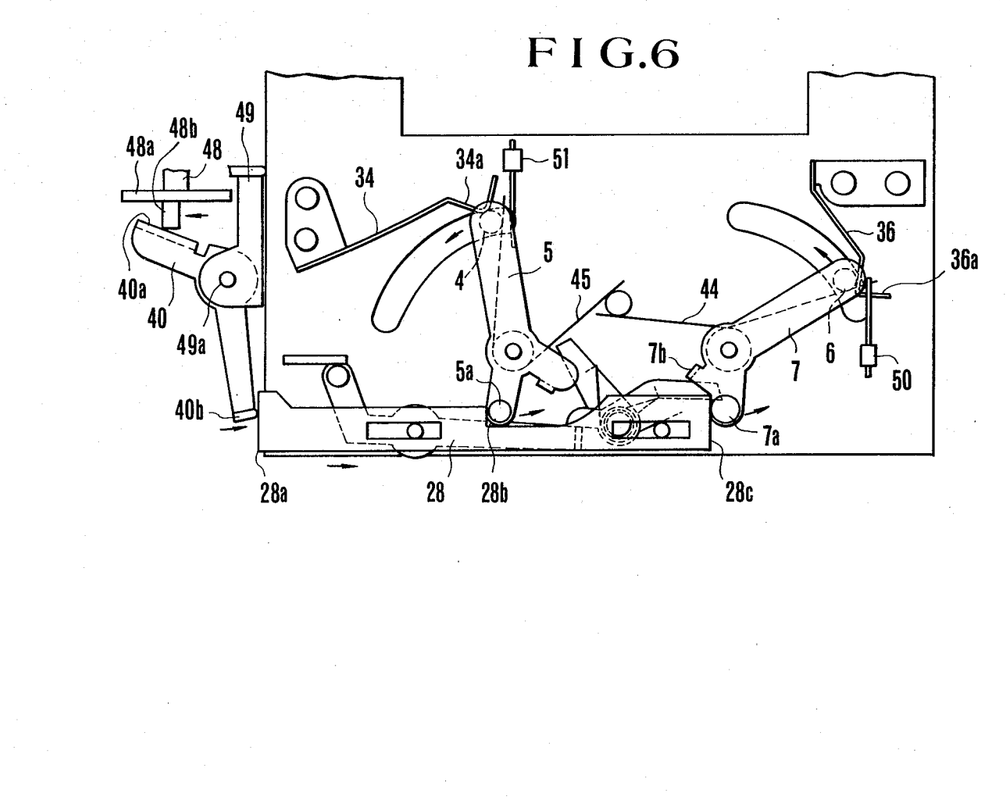

Upon completion of the travel of the trailing shutter blades, a known means for winding film begins to perform a film winding operation. FIG. 6 shows the shutter as in a state immediately after commencement of the film winding operation. A film winding responsive shaft 48 which is responsive to the operation of a film winding mechanism begins to turn. Then, a pin 48b moves from right to left over a rotating plate 48a as viewed on the drawing. The pin 48b comes to push the upper surface of the bent part 40a of the return lever 40. This causes the lever 40 to turn counterclockwise about the shaft 49a. The lower end 40b of the lever 40 then pushes the left end part 28a of the charge lever 28 to cause the lever 28 to move in the direction of the arrow. The right end part 28c of the charge lever 28 pushes the pin 7a of the leading blade driving lever 7. A notched edge 28b which is provided in the middle part of the charge lever 28 then pushes the pin 5a which is provided on the trailing blade driving lever 5. As a result, the driving levers 7 and 5 receive a rotating force which is exerted in the counterclockwise direction reverse to the travelling direction of the driving levers 7 and 5 and the leading blade and trailing blade driving pins 6 and 4 are thus forced to ride over the bent parts 36a and 34a of the holding springs 36 and 34 and these levers 7 and 5 are thus released from their states of being held in the travel completion positions. After that, further turning movement of the return lever 40 pushes the driving levers 7 and 5 at a high speed toward their travel start positions. Then, they are brought back to the travel start positions by the weak forces of the return springs 44 and 45. The return lever 40 and the charge lever 28 are brought back to their initial positions by the forces of springs which are not shown when the film winding responsive shaft 48 comes to a stop after completion of one turn thereof.

Figure 7:
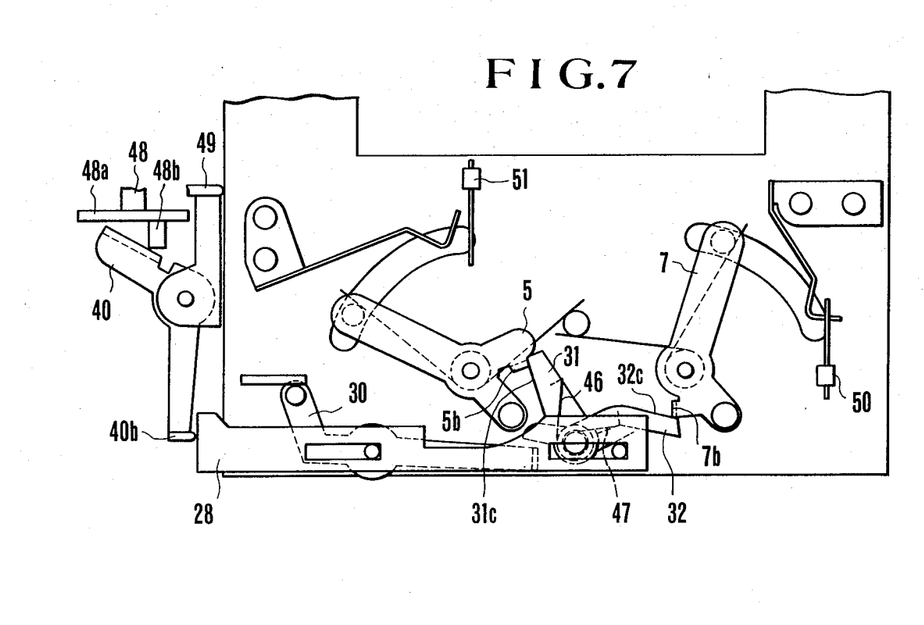

During the returning travel of the leading blade driving lever 7, the arm part 7b of the lever 7 comes to abut on the side face 32c of the leading blade spring-out blocking lever 32 and the lever 7 further turns while pushing the lever 32 as shown in FIG. 7. The lever 7 disengages the lever 32 immediately before the travel start position thereof. This allows the blocking lever 32 to be turned by the force of the return spring 47 back to its travel blocking position to prevent the driving lever 7 from bouncing backward when the latter comes back. Further, the bounce is converted into vibrations of a short period by the slight distance left between the two levers and attenuates very quickly to settle the leading blade driving lever 7 into a reposed state. The trailing blade driving lever 5 is likewise prevented from bouncing and becomes stationary by virtue of the blocking lever 31. In this manner, the shutter blades come into a travel waiting state as shown in FIG. 3 and a series of the shutter operating processes come to an end.

In accordance with this invention, as described in the foregoing, the arrangement which mechanically keeps the shutter blades in their travel completed positions enables even an electro-magnetically driven shutter of a weak driving force to keep its blades in the travel completed positions without necessitating a continuous flow of a large current. The invention thus gives a highly stable and accurate electro-magnetically driven shutter which not only permits saving of electric energy but obviates the fear of variations in the shutter speed due to heat as mentioned in the foregoing.

Further, the arrangement to have the shutter blades forcedly released from their states of being mechanically kept in their travel completed positions by pushing them back in association with a film winding operation enables even an electro-magnetically driven shutter having only a weak driving force not only to have the shutter blades unlocked from their travel completed positions without recourse to a large current flow but also to permit a motor drive arrangement to saliently increase the phototaking frame feeding speed which has heretofore been difficult to increase due to the return springs which are weakly set because of the weak driving force. It is another advantage of this invention that the shutter has stable accuracy because of an ample length of time allowed between the return of the shutter blades and the next travel of them.

In accordance with the invention, the blocking members which prevent the shutter blades from spring out are arranged to be retracted from their blocking positions during the travel of the shutter blocks and to prevent them from bouncing when they come back to their original positions. That arrangment enables even an electro-magnetically driven shutter which is unable to have strong return springs due to a weak driving force to prevent the shutter blades both from springing out in their travel waiting conditions and from bouncing upon their return to their original positions. Further, the bounce of the blades which takes place upon their return is arranged to be quickly attenuated by converting it into vibrations of a short period between the blades and the blocking members, so that the shutter blades can be quickly brought into a reposed state. This arrangment is advantageous particularly in the case of a motor drive arrangement or a high speed motor driven camera wherein only a short time interval is allowed between the return of the shutter blades to their travel start positions and their next travel.

While a specific embodiment of the invention has been shown and described in detail to illustrate the application of the inventive principles, it wll be understood that the invention may be embodied otherwise without departing from such principles.

What is claimed is:

1. An electro-magnetically driven shutter comprising:
   (a) shutter means for effecting an exposure by traveling from a travel start position to a travel complete position;
   (b) electro-magnetic drive means for driving said shutter means by an electro-magnetic force to cause it to travel from said travel start position to said travel completed position;
   (c) returning means for causing said shutter means to be returned by a driving force of a photograph preparative operation from said travel completed position to said travel start position; and
   (d) holding means for holding said shutter means in said travel completed position, said holding means performing said holding of said shutter means by a mechanical holding member biased by a spring in the direction of said holding.

2. A shutter according to claim 1, wherein said photograph preparative operation of said returning means is performed by a film winding operation.

3. A shutter according to claim 1, wherein said returning means is arranged to forcedly cancel the holding action of said mechanical holding member.

4. A shutter according to claim 1, further comprising an elastic member for returning said shutter means to said travel start position, and wherein said electro-magnetic drive means is arranged to drive said shutter means to travel against the force of said elastic member.

5. A shutter according to claim 1, wherein said mechanical holding member of said holding means is insertable into and retractable from the movement path of said shutter means and is arranged to come into said path when said shutter means is returned to said travel start position and to move away from said path when said shutter means in moving.

6. An electro-magnetically driven shutter comprising:
   (a) a shutter means for effecting an exposure by traveling from a travel start position to a travel completed position;
   (b) electro-magnetic drive means for driving said shutter means by an electro-magnetic force to cause it to travel from said travel start position to said travel completed position;
   (c) returning means for causing said shutter means to be returned by a driving force of a photograph preparative operation from said travel completed position to said travel start position;
   (d) holding means for holding said shutter means in said travel complete position, said holding means performing said holding of said shutter means by a mechanical holding member biased by a spring in the direction of said holding; and
   (e) said returning means being arranged to forcedly cancel the holding action of said mechanical holding member.

7. An electro-magnetically driven shutter comprising:
   (a) shutter means for effecting an exposure by traveling from a travel start position to a travel completed position;
   (b) electro-magnetic drive means for driving said shutter means by an electro-magnetic force to cause it to travel from said travel start position to said travel completed position;
   (c) returning means for causing said shutter means to be returned by a driving force of a photograph preparative operation from said travel completed position to said travel start position;
   (d) holding means for holding said shutter means in said travel completed position, said holding means performing said holding of said shutter means by a mechanical holding member biased by a spring in the direction of said holding; and
   (e) said mechanical member of said holding means being insertable into and retractable from the movement path of said shutter means and being arranged to come into said path when said shutter means is returning to said travel start position and to move away from said path when said shutter means is moving.

* * * * *